US00RE49452E

(19) United States
(12) Reissued Patent
Kwak et al.

(10) Patent Number: US RE49,452 E
(45) Date of Reissued Patent: *Mar. 7, 2023

(54) METHOD AND APPARATUS FOR TRANSMITTING AND RECEIVING COMMON CHANNEL INFORMATION IN WIRELESS COMMUNICATION SYSTEM

(71) Applicant: Samsung Electronics Co., Ltd., Gyeonggi-do (KR)

(72) Inventors: Yongjun Kwak, Gyeonggi-do (KR); Younsun Kim, Gyeonggi-do (KR); Hyoungju Ji, Seoul (KR); Juho Lee, Gyeonggi-do (KR); Hyojin Lee, Gyeonggi-do (KR); Joonyoung Cho, Gyeonggi-do (KR)

(73) Assignee: Samsung Electronics Co., Ltd

( * ) Notice: This patent is subject to a terminal disclaimer.

(21) Appl. No.: 16/521,262

(22) Filed: Jul. 24, 2019

Related U.S. Patent Documents

Reissue of:
(64) Patent No.: 9,948,439
Issued: Apr. 17, 2018
Appl. No.: 14/062,231
Filed: Oct. 24, 2013

U.S. Applications:
(63) Continuation of application No. 16/520,809, filed on Jul. 24, 2019, which is an application for the reissue of Pat. No. 9,948,439.

(30) Foreign Application Priority Data

Oct. 24, 2012 (KR) ..... 10-2012-0118182
Nov. 6, 2012 (KR) ..... 10-2012-0125012

(51) Int. Cl.
*H04B 7/04* (2017.01)
*H04W 72/00* (2009.01)
(Continued)

(52) U.S. Cl.
CPC ..... *H04L 5/0044* (2013.01); *H04B 7/0695* (2013.01); *H04L 5/0007* (2013.01);
(Continued)

(58) Field of Classification Search
CPC ... H04L 5/0044; H04L 5/0007; H04L 5/0064; H04B 7/0695; H04W 16/28
See application file for complete search history.

(56) References Cited

U.S. PATENT DOCUMENTS 7,532,590 B2 * 5/2009 Ok ..... H04B 1/70735 370/310
7,693,123 B2 * 4/2010 Rudolf ..... H04B 1/7083 370/342
(Continued)

FOREIGN PATENT DOCUMENTS

KR 10-2008-0083058 9/2008
WO WO-2008083886 A1 * 7/2008 ..... H04B 7/2681
(Continued)

OTHER PUBLICATIONS

Samsung "Cell Search Procedure and Channel Structure", R1-060812, Mar. 27-31, 2006. (Year: 2006).*
(Continued)

*Primary Examiner* — Luke S Wassum
(74) *Attorney, Agent, or Firm* — The Farrell Law Firm, P.C.

(57) ABSTRACT

Methods and apparatus are provided for transmission and reception of common channel information in a mobile communication system using multi-antenna-based beamforming. A number of beams to be used for transmission to a terminal is determined at a base station. The common channel information is generated corresponding to the number of beams. The common channel information is trans-
(Continued)

mitted from the base station to the terminal through one of the beams.

20 Claims, 13 Drawing Sheets

(51) Int. Cl.
*H04J 3/06* (2006.01)
*H04B 7/06* (2006.01)
*H04W 16/28* (2009.01)
*H04L 5/00* (2006.01)

(52) U.S. Cl.
CPC ..... *H04L 5/0064* (2013.01); *H04W 16/28* (2013.01); *Y02D 30/70* (2020.08)

(56) References Cited

U.S. PATENT DOCUMENTS 7,920,503 B2 * 4/2011 Lim ..... H04B 7/2041 370/316
7,983,236 B2 * 7/2011 Rinne ..... H04B 7/0669 370/203
8,155,106 B2 * 4/2012 Han ..... H04B 1/70735 370/350
8,170,132 B2 * 5/2012 Yang ..... H04B 7/0617 375/260
8,189,557 B2 * 5/2012 Onggosanusi ..... H04J 11/0069 370/350
8,243,678 B2 * 8/2012 Cudak ..... H04L 5/0007 370/330
8,254,295 B2 * 8/2012 Choi ..... H04L 5/14 370/280
8,374,260 B2 * 2/2013 Schirmacher ..... H04B 7/0404 375/260
8,379,592 B2 * 2/2013 van Rensburg ... H04W 72/1231 370/330
8,396,035 B2 * 3/2013 van Rensburg et al. ..... H04W 72/1231 370/330
8,503,425 B2 * 8/2013 Chung ..... H04L 1/1861 370/349
8,526,295 B2 * 9/2013 Lin ..... H04B 7/0617 370/203
8,537,790 B2 * 9/2013 Cudak ..... H04L 5/0007 370/337
8,543,063 B2 * 9/2013 Bergel et al. ..... 455/63.1
8,614,994 B2 * 12/2013 Swarts et al. ..... H04L 27/2655 370/336
8,675,508 B2 * 3/2014 Baker ..... H04B 7/0617 370/252
8,693,429 B2 * 4/2014 Montojo et al. ..... 370/330
8,731,555 B2 * 5/2014 Yokoyama ..... H04W 72/085 455/436
8,750,153 B2 * 6/2014 Kang et al. ..... 370/252
8,917,696 B2 * 12/2014 Wan ..... H04J 11/0093 370/204
8,948,208 B2 * 2/2015 Malladi ..... H04J 11/00 370/503
8,995,548 B2 * 3/2015 Kloos ..... H04L 5/0048 375/260
8,995,916 B2 * 3/2015 Tsutsui et al. ..... H04B 7/0417 455/59
9,094,146 B2 * 7/2015 Lindoff ..... H04J 11/0076
9,119,209 B2 * 8/2015 Nam ..... H04W 72/046
9,265,052 B2 * 2/2016 Nagata ..... H04W 16/28
9,516,513 B2 * 12/2016 Saegrov et al. ..... H01Q 3/2605
9,674,829 B2 * 6/2017 Kim ..... H04L 5/0053
9,948,439 B2 * 4/2018 Kwak ..... H04L 5/0007
2007/0177535 A1 * 8/2007 Zalio ..... H04B 1/70735 370/328
2007/0248068 A1 * 10/2007 Onggosanusi ..... H04J 11/0069 370/338
2007/0285312 A1 * 12/2007 Gao et al. ..... 342/367
2009/0170514 A1 7/2009 Yokoyama ..... H04W 72/085 455/436
2009/0252109 A1 * 10/2009 Kim ..... H04B 7/0689 370/330
2009/0296644 A1 * 12/2009 Ch ..... H04L 65/4084 370/329
2010/0034163 A1 * 2/2010 Damnjanovic ..... H04L 5/0053 370/329
2010/0046667 A1 * 2/2010 Tsutsui ..... 375/296
2010/0061322 A1 * 3/2010 Kim et al. ..... H04J 11/0069 370/329
2010/0069119 A1 * 3/2010 Mueck ..... H04W 48/08 455/561
2010/0075705 A1 * 3/2010 van Rensburg ..... H04B 7/024 455/509
2010/0173639 A1 * 7/2010 Li ..... H04B 7/0639 455/450
2010/0182966 A1 * 7/2010 Kishiyama ..... H04L 27/2655 370/329
2010/0265882 A1 * 10/2010 Nagata ..... H04J 11/0086 370/328
2010/0272034 A1 * 10/2010 Imai ..... H04L 25/0204 370/329
2010/0315963 A1 * 12/2010 Jading ..... H04W 36/0007 370/252
2010/0323711 A1 * 12/2010 Damnjanovic et al. ..... 455/450
2011/0009052 A1 * 1/2011 Horiuchi ..... H04B 1/7083 455/7
2011/0075621 A1 * 3/2011 Sung ..... H04W 48/12 370/329
2011/0090997 A1 * 4/2011 Han ..... H04L 1/0606 375/354
2011/0207494 A1 * 8/2011 Zhu et al. ..... 455/509
2011/0268077 A1 * 11/2011 Wan ..... H04J 11/0053 370/329
2011/0306335 A1 * 12/2011 Yang ..... H04L 5/0051 455/422.1
2012/0009963 A1 * 1/2012 Kim ..... H04L 5/0053 455/509
2012/0076028 A1 * 3/2012 Ko ..... H04B 7/0626 370/252
2012/0140862 A1 6/2012 Fine et al.
2012/0155338 A1 * 6/2012 Noh ..... H04L 5/0048 370/280
2012/0163305 A1 * 6/2012 Nimbalker ..... H04W 52/0206 370/329
2012/0219155 A1 * 8/2012 Drugge ..... H04J 11/0079 380/287
2012/0250663 A1 * 10/2012 Han ..... H04L 5/0053 370/336
2012/0269113 A1 * 10/2012 Park ..... H04B 7/2656 370/315
2013/0010641 A1 * 1/2013 Dinan ..... H04W 36/0072 370/254
2013/0010745 A1 * 1/2013 Ko ..... H04B 7/0617 370/329
2013/0016604 A1 * 1/2013 Ko ..... H04B 7/0404 370/216
2013/0028186 A1 * 1/2013 Kim ..... H04B 7/0695 370/328
2013/0028213 A1 * 1/2013 Ko ..... H04L 1/1816 370/329
2013/0058234 A1 * 3/2013 Yang ..... H04W 72/0446 370/252
2013/0107854 A1 * 5/2013 Han ..... H04L 5/0053 370/330
2013/0109391 A1 * 5/2013 Lee et al. ..... H04W 48/12 455/436
2013/0128765 A1 * 5/2013 Yang ..... H04W 24/00 370/252
2013/0155891 A1 * 6/2013 Dinan ..... H04L 5/0053 370/252
2013/0156122 A1 6/2013 Tsutsui et al.
2013/0163487 A1 * 6/2013 Yang ..... H04L 1/1861 370/281

(56) References Cited

U.S. PATENT DOCUMENTS

2013/0176982 A1* 7/2013 Han ..... H04L 1/0073 370/329
2013/0182789 A1* 7/2013 Ko ..... H04B 7/0626 375/267
2013/0188535 A1* 7/2013 Seo ..... H04L 5/0055 370/280
2013/0188591 A1* 7/2013 Ko ..... H04B 7/0639 370/329
2013/0223266 A1* 8/2013 Goto ..... H04W 52/241 370/252
2013/0272189 A1* 10/2013 Lee ..... H04L 5/0007 370/315
2013/0272261 A1* 10/2013 Seo ..... H04J 11/0056 370/329
2013/0279356 A1* 10/2013 Park ..... H04W 24/02 370/252
2013/0279460 A1* 10/2013 Kim ..... H04L 5/0057 370/329
2013/0286960 A1* 10/2013 Li ..... H04W 72/042 370/329
2013/0308548 A1* 11/2013 Kim ..... H04W 24/10 370/328
2013/0322361 A1* 12/2013 Ko ..... H04B 7/0486 370/329
2014/0029565 A1* 1/2014 Kim ..... H04L 5/0094 370/329
2014/0044084 A1* 2/2014 Lee ..... H04W 72/042 370/329
2014/0050206 A1* 2/2014 Seo ..... H04J 11/0069 370/336
2014/0133373 A1* 5/2014 Han ..... H04L 5/0053 370/281
2014/0161090 A1* 6/2014 Lee ..... H04L 1/1822 370/329
2014/0169315 A1* 6/2014 Han ..... H04L 1/1861 370/329
2014/0185539 A1* 7/2014 Seo ..... H04W 72/1278 370/329
2014/0192671 A1* 7/2014 Lim ..... H04L 5/005 370/252
2014/0226552 A1* 8/2014 Niu ..... H04W 4/06 370/312
2014/0241300 A1* 8/2014 Park ..... H04W 72/0453 370/329
2014/0307685 A1* 10/2014 Takano ..... H04W 72/0426 370/329
2014/0334416 A1* 11/2014 Ko ..... H04L 5/0053 370/329
2014/0348098 A1* 11/2014 Lee ..... H04L 5/1469 370/329
2014/0355493 A1* 12/2014 Niu ..... H04L 12/189 370/280
2014/0355572 A1* 12/2014 Khandekar ..... H04W 74/0891 370/336
2014/0376395 A1* 12/2014 Kim ..... H04L 5/0053 370/252
2014/0376489 A1* 12/2014 Lee ..... H04L 1/1607 370/329
2015/0036560 A1* 2/2015 Kim ..... H04W 72/0406 370/280
2015/0055580 A1* 2/2015 Lim ..... H04W 52/367 370/329
2015/0085782 A1* 3/2015 Seo ..... H04L 1/1854 370/329
2015/0103683 A1* 4/2015 Kim ..... H04W 24/02 370/252
2015/0156763 A1* 6/2015 Seo ..... H04L 5/1469 370/329
2015/0163037 A1* 6/2015 Seo ..... H04L 5/0094 370/336
2015/0163707 A1* 6/2015 Hwang ..... H04W 36/0061 370/331
2015/0163800 A1* 6/2015 Kim ..... H04W 72/0446 370/329
2015/0173048 A1* 6/2015 Seo ..... H04L 1/0031 370/329
2015/0181543 A1* 6/2015 Hwang ..... H04W 56/0085 370/336
2015/0181624 A1* 6/2015 Hwang ..... H04L 5/0053 370/329
2015/0195062 A1* 7/2015 Hwang ..... H04L 1/1607 370/329
2015/0223235 A1* 8/2015 Hwang ..... H04B 7/066 370/329
2015/0245302 A1* 8/2015 Lim ..... H04W 52/146 455/522
2015/0289216 A1* 10/2015 Xing ..... H04W 56/001 455/422.1
2015/0304092 A1* 10/2015 Hwang ..... H04L 5/14 370/280
2015/0304909 A1* 10/2015 Yoshimoto ..... H04W 36/0066 370/331
2015/0327093 A1* 11/2015 Yang ..... H04W 24/08 370/252
2016/0021655 A1* 1/2016 Seo ..... H04W 76/14 370/280
2017/0006605 A1* 1/2017 Seo ..... H04W 72/042

FOREIGN PATENT DOCUMENTS

WO WO 2010/054252 5/2010
WO WO-2010054252 A1 * 5/2010 ..... H04B 7/0617
WO WO 2011/003744 1/2011

OTHER PUBLICATIONS

NTT DoCoMo et al. "Three-Step Cell Search Method for E-UTRA", R1-062095, Aug. 28-Sep. 1, 2006. (Year: 2006).*
3GPP "Physical Layer Aspects for Evolved Universal Terrestrial Radio Access (UTRA)", 3GPP TR 25.814 V7.1.0, Sep. 2006. (Year: 2006).*
InterDigital Communications Corporation "Cell Search Proposal for E-UTRA", R1-062495, Oct. 9-13, 2006. (Year: 2006).*
Samsung "Cell Search Procedure and Channel Structure", R1-062518, Oct. 9-13, 2006. (Year: 2006).*
Texas Instruments "Proposal for DL Sync Channel (SCH) for E-UTRA Cell Search", R1-062635, Oct. 9-13, 2006. (Year: 2006).*
Nokia et al. "Outcome of Cell Search Drafting Session", R1-062990, Oct. 9-13, 2006. (Year: 2006).*
NTT DoCoMo et al. "Transmit Diversity Scheme for SCH in E-UTRA", R1-071630, Mar. 26-30, 2007. (Year: 2007).*
3GPP "Evolved Universal Terrestrial Radio Access (E-UTRA) and Evolved Universal Terrestrial Radio Access Network (E-UTRAN); Overall Description; Stage 2", 3GPP TS 36.300 V8.2.0, Sep. 2007. (Year: 2007).*
3GPP "Evolved Universal Terrestrial Radio Access (E-UTRA) and Evolved Universal Terrestrial Radio Access Network (E-UTRAN); Overall Description; Stage 2", 3GPP TS 36.300 V10.8.0, Jun. 2012. (Year: 2012).*
3GPP "Evolved Universal Terrestrial Radio Access (E-UTRA); Radio Resource Control (RRC); Protocol Specification", 3GPP TS 36.331 V8.17.0, Jun. 2012. (Year: 2012).*
3GPP "Evolved Universal Radio Access (E-UTRA); Physical Channels and Modulation", 3GPP TS 36.211 V11.0.0, Sep. 2012. (Year: 2012).*
Written Opinion, PCT/KR2013/009498, dated Feb. 7, 2014. (Year: 2014).*
International Search Report, PCT/KR2013/009498, dated Feb. 10, 2014. (Year: 2014).*
U.S. Notice of Allowance dated Jan. 12, 2023 issued in counterpart U.S. Appl. No. 16/521,250, 14 pages.

* cited by examiner

METHOD AND APPARATUS FOR TRANSMITTING AND RECEIVING COMMON CHANNEL INFORMATION IN WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one Reissue Application has been filed for U.S. Pat. No. 9,948,439. This application is a Continuation Reissue of U.S. application Ser. No. 16/520,809, which is a Reissue Application of U.S. Pat. No. 9,948,439.*

PRIORITY

This application claims priority under 35 U.S.C. 119(a) to applications filed in the Korean Intellectual Property Office on Oct. 24, 2012 and Nov. 6, 2012, and assigned Serial Nos. 10-2012-0118182 and 10-2012-0125012, respectively, the contents of which are incorporated herein by reference.

BACKGROUND OF THE INVENTION

1. Field of the Invention

The present invention relates generally to a wireless mobile communication system and, more particularly, to initial access procedure for a terminal to initially access a base station or a cell, and a method and apparatus for transmitting/receiving common channel information therefore in a mobile communication system supporting a Multiple Input Multiple Output (MIMO) beamforming.

2. Description of the Related Art

Mobile communication systems have evolved into high-speed, high-quality wireless packet data communication systems that provide data and multimedia services beyond those of the early voice-oriented services. Various mobile communication standards, such as, for example, High Speed Downlink Packet Access (HSDPA), High Speed Uplink Packet Access (HSUPA), Long Term Evolution (LTE), and LTE-Advanced (LTE-A) defined in 3rd Generation Partnership Project (3GPP), High Rate Packet Data (HRPD) defined in 3rd Generation Partnership Project-2 (3GPP2), and 802.16 defined in Institute of Electrical and Electronics Engineers (IEEE), have been developed to support the high-speed, high-quality wireless packet data communication services.

In a wireless mobile communication system, a terminal is required to perform an initial access procedure to communicate with a base station. In the initial access procedure, the terminal receives a synchronization signal or Synchronization CHannel (SCH) to acquire downlink synchronization, checks frame timing or a Cell IDentifier (ID), and receives unique system information, base station information, or cell information.

Most communication standards adopt a multi-carrier multiple access technique such as, for example, Orthogonal Frequency Division Multiplexing (Multiple Access) (OFDM (A)) using multiple subcarriers. In a multi-carrier multiple access-based wireless mobile communication system, channel estimation and measurement performance is influenced by the number of symbols and the number of subcarriers to which the reference signal is mapped on the time-frequency resource grid. The channel estimation and measurement performance is also influenced by the power that is allocated for reference signal transmission. Accordingly, by allocating more radio resources (including time, frequency, and power), it is possible to improve the channel estimation and measurement performance, resulting in improved received data symbol demodulation and decoding performance and channel state measurement accuracy.

In a resource-constrained mobile communication system, however, if a radio resource is allocated for transmitting resource signals, the resource amount for data signal transmission is reduced. For this reason, the resource amount for the reference signal transmission is determined by taking the system throughput into account.

Existing 3rd generation mobile communications including LTE, Ultra Mobile Broadband (UMB), and 802.16m operate based on a multi-carrier multiple access scheme, and adopt MIMO with channel sensitive scheduling such as, for example, beamforming and Adaptive Modulation and Coding (AMC), to improve transmission efficiency. Furthermore, many efforts are being made to improve the transmission efficiency with technical enhancements of the MIMO and beamforming techniques. One such effort to improve transmission efficiency is Full-Dimension MIMO (FD-MIMO), which is a technique capable of forming various beams with a few dozen antennas.

FD-MIMO is a technique for forming a narrow and long transmit beam to transmit data using a plurality of antennas so as to send the data to a terminal (or User Equipment (UE)) that far from the base station (or evolved Node B (eNB)) at a low transmit power. The FD-MIMO makes it possible to form various types of beams depending on the number of antennas, and also makes it possible to freely adjust the size, distance, and width of a beam according to the weights applied to the antennas, to a certain extent.

FIG. 1 is a diagram illustrating the concept of the FD-MIMO. In FIG. 1, an eNB 101 uses the FD-MIMO technique, and manages three cells 102, 103, and 104. The eNB 101 is required to provide UEs with a data transmission/reception service within the coverage area of the cell 102. The eNB 101 is required to guarantee a satisfactory data transmission to UE 110 located at a cell edge 106. Using the FD-MIMO technique, it is possible to form a narrow beam 112, 113 using several antennas and to concentrate the power within the beam 111, so as to transmit data to the UE 110 at relatively low transmit power, as denoted by reference number 111. Specifically, when it is possible to form a narrow beam with the FD-MIMO, it is also possible to reduce the transmit power for transmitting the same data as compared to the legacy method.

Based on the low transmit power characteristic of the FD-MIMO, the eNB 101 is capable of maintaining the transmit power at a low level within the cell 102. If the eNB is able to maintain the low transmit power level, it is possible to reduce the power range supported by the power amplifier installed in the eNB 101 and, as a consequence, significantly reduce the cost of the power amplifier. Since the cost of the power amplifier is an important factor in determining the eNB installation cost, the FD-MIMO is advantageous in view of the entire system implementation cost. Furthermore, the FD-MIMO is advantageous in that the reduced average power consumption makes it possible to contribute the environment-friendly Green Communication initiative.

In FIG. 1, if the conventional method using no FD-MIMO beamforming is applied, the data transmission coverage is restricted to the area as denoted by reference number 105 within the area as denoted by reference number 102.

Even when the eNB 101 transmits data to the UE 110 located at the cell edge at a relatively low transmit power, the data can be delivered to the UE 110 with the beamforming gain. In the case of the data broadcast within a cell, however, it is difficult for the eNB 101 to generate the signal covering the entire cell at the power level determined in consideration of the FD-MIMO power gain. For example, in order to generate the signal which UEs 110, 121, and 122 can receive within the cell 102, it is necessary to allocate a transmit power strong enough to cover the entire cell, which the eNB 101 is not able to support.

There are many signals that should be broadcast within the cell, e.g. common channel information such as an SCH necessary for acquiring synchronization between the UE and the eNB and a Broadcast CHannel (BCH) in which the eNB broadcasts the cell information.

SUMMARY OF THE INVENTION

The present invention has been made to address at least the above problems and/or disadvantages and to provide at least the advantages described below. Accordingly, an aspect of the present invention provides a method and apparatus for transmitting distinct synchronization signal and system information depending on the transmission beam for facilitating initial access of the UE in the LTE-A system, which supports MIMO beamforming with a plurality of antennas.

Another aspect of the present invention provides an initial access method that is capable of transmitting signal efficiently at low transmit power level in the FD-MIMO system having a few dozen or more transmit antennas.

In accordance with an aspect of the present invention, a method is provided for transmission of common channel information in a base station of a mobile communication system using multi-antenna-based beamforming. A number of beams to be used for transmission to a terminal is determined. The common channel information is generated corresponding to the number of beams. The common channel information is transmitted through one of the beams.

In accordance with another aspect of the present invention, a method is provided for receiving common channel information at a terminal in a mobile communication system using multi-antenna-based beamforming. The common channel information, transmitted by a base station, is received. Frame timing is acquired based on the common channel information. A signal transmitted by the base station is processed based on the frame timing. The common channel information is generated based on a number of beams used by the base station, and the common channel information is transmitted through one of the beams.

In accordance with another aspect of the present invention, a base station is provided for transmitting common channel information in a mobile communication system using multi-antenna-based beamforming. The base station includes a transceiver configured to transmit and receive signals to and from a terminal. The base station also includes a controller configured to determine a number of beams to be used for transmission to a terminal, generate the common channel information corresponding to the number of beams, and control the transceiver to transmit the common channel information through one of the beams.

In accordance with still another aspect of the present invention, a terminal is provided for receiving common channel information in a mobile communication system using multi-antenna-based beamforming. The terminal includes a transceiver configured to transmit and receive signals to and from a base station. The terminal also includes a controller configured to control receiving the common channel information transmitted by a base station, acquire frame timing based on the common channel information, and process a signal transmitted by the base station based on the frame timing. The common channel information is generated based on a number of beams used by the base station, and the common channel information is transmitted through one of the beams.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
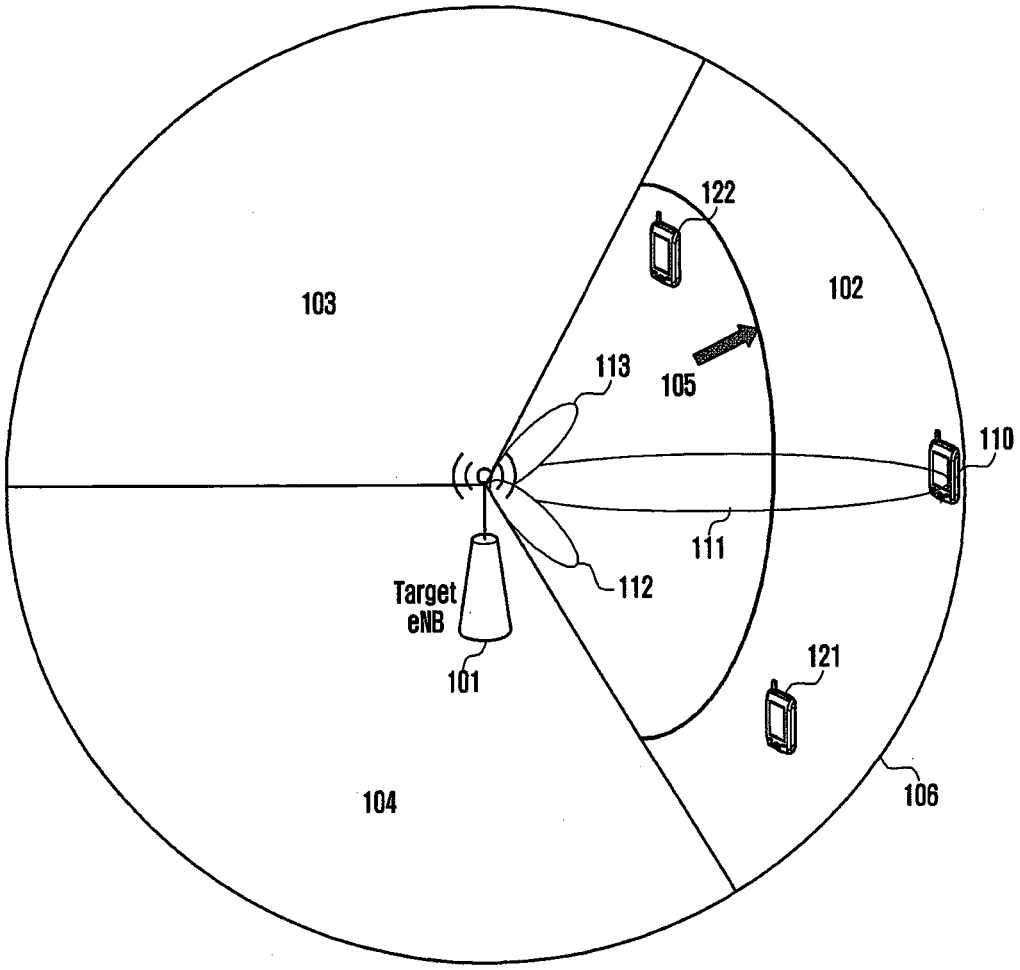
FIG. 1 is a diagram illustrating the concept of the FD-MIMO.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the following terms are defined in consideration of their functionality in embodiment of the present invention, and may vary according to the intention of a user or an operator, usage, etc. Therefore, the definition should be made on the basis of the overall content of the present specification.

Although the description is directed to an OFDM-based radio communication system, particularly the 3GPP Evolved Universal Mobile Telecommunications System (UMTS) Terrestrial Radio Access (EUTRA), it will be understood by those skilled in the art that embodiments of the present invention can be applied even to other communication systems having a similar technical background and channel format, with a slight modification, without departing from the spirit and scope of the present invention.

In an 3GPP LTE mobile communication system, the UE first performs an initial access procedure for communication with an eNB. The initial access procedure includes acquiring subframe timing synchronization and frame timing synchronization with the eNB, receiving an eNB signal to acquire an ID of the eNB, acquiring system information of the eNB from the received signal, and configuring downlink and uplink for uplink random access.

Figure 2:
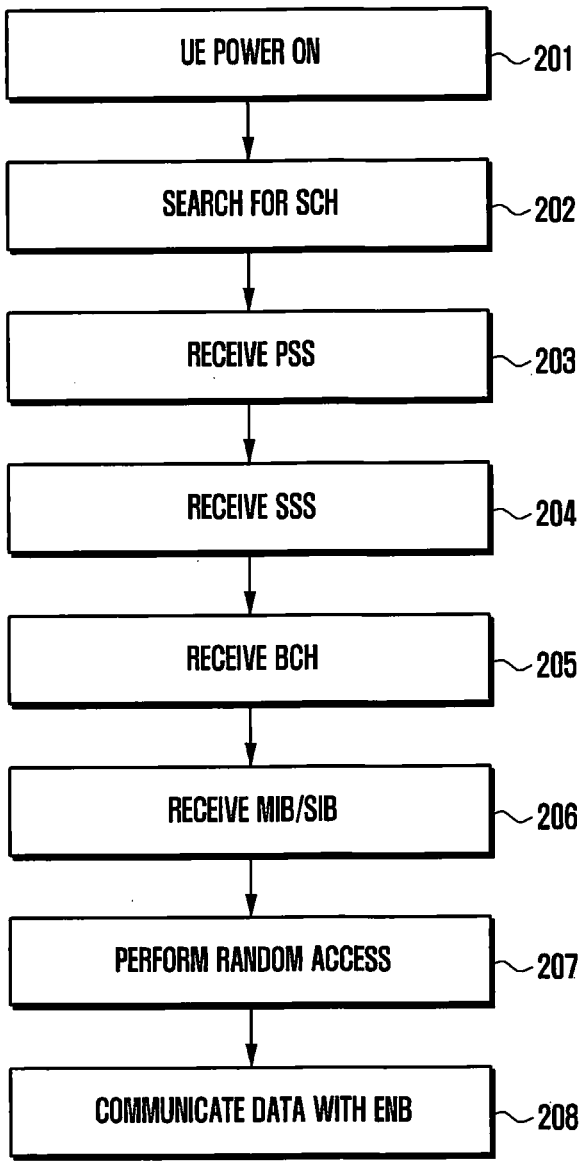
FIG. 2 is a flowchart illustrating an initial access procedure in the wireless communication system, according to an embodiment of the present invention.

FIG. 2 is a flowchart illustrating an initial access procedure in the wireless communication system, according to an embodiment of the present invention.

The UE powers on, in step operation 201. The UE searches for an SCH, in step 202. The SCH includes a Primary Synchronization Signal (PSS) (hereinafter, the term 'first synchronization signal' is used interchangeably) and a Secondary Synchronization Signal (SSS) (hereinafter, the term 'second' synchronization signal is used interchangeably). The UE receives the PSS, in step 203, and acquires the subframe time of the eNB based on the PSS. The UE receives the SSS, in step 204, and acquires the accurate frame timing and cell ID of the eNB based on the SSS so as to check the positions of the Cell-specific Reference Signal (CRS) for use in receiving downlink signal.

The UE receives a BCH, in step 205. The BCH includes a Master Information Block (MIB) as unique system information. The MIB includes scheduling information on a System Information Block (SIB) carrying more detailed system information. The MIB is received through BCH, in step 206. The UE acquires scheduling information on the SIB and receives Downlink Shared Channel (DL-SCH) at the corresponding timing based on the SIB scheduling information to acquire the SIB information, resulting in acquisition of entire system information. The SIB information includes operator information, cell bandwidth, neighbor cell information, and random access information. The UE performs random access to establish a communication channel, in step 207, and communicates data with the eNB, in step 208.

Figure 3:
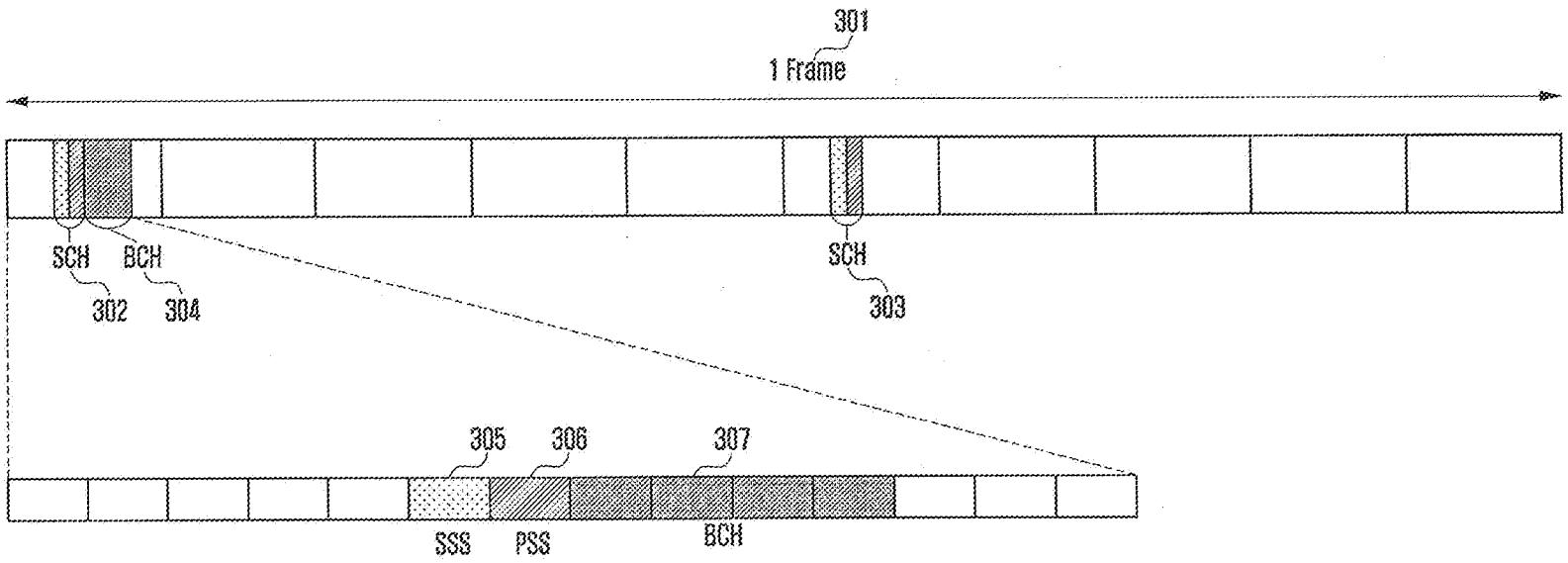
FIG. 3 is a diagram illustrating a frame structure including SCH and BCH for use in an LTE system, according to an embodiment of the present invention.

FIG. 3 is a diagram illustrating a frame structure including SCH and BCH for use in the current LTE system, according to an embodiment of the present invention.

A radio frame 301 consists of 10 subframes, and the SCH is a carrier in first and sixth subframes 302 and 303 among the 10 subframes. The first subframe also carries BCH 304. Specifically, the first subframe of the radio frame 301 carries both the SCH and BCH.

Each of the SCHs 302 and 303 includes PSS and SSS. The UE receives the SCH 302 and 303 to acquire frame timing. In LTE, the SCHs 302 and 303 use different codes, and each SCH consist of PSS 306 and SSS 305. The PSS provides the UE with one of three possible physical layer identities and the SSS provides the UE with one of 168 cell layer identities, and thus, there are total 504 possible physical layer cell identities.

The PSS uses the same code at the first and sixth subframe 302 and 303. Accordingly, if PSS is received, the UE acquires the subframe timing so as to receive the SSS preceding right before. Meanwhile, SSS uses different subcarrier mappings at the first and sixth subframe 302 and 303 and thus the UE is capable of acquiring frame timing with the receipt of only one of two SSS.

As described with reference to FIG. 2, the UE acquires the frame timing and cell ID by receiving SCH including PSS and SSS and checks the position of CRS to receive BCH 304 coherently. The BCH is transmitted only at the first subframe of each radio frame as denoted by reference number 307 of FIG. 3, especially at the first 4 OFDM symbols of the second slot of the first subframe. The UE receives the BCH over several frames to acquire the system information and performs random access and other operation necessary for communication with the eNB.

By taking notice of the beamforming gain expected with FD-MIMO, it is possible to reduce the transmit power level of the UE while maintaining the cell coverage. Although the beamforming is useful for transmitting data to one UE, it cannot be used in broadcast, e.g., a common channel such as SCH and BCH of LTE. This means that the reduced transmit power level of FD-MIMO is not enough to broadcast the common channel, which all of the UEs within the cell must receive.

Embodiments of the present invention proposes a method to transmit the common channel at different timings with several beams to cover an entire cell area.

Figure 4:
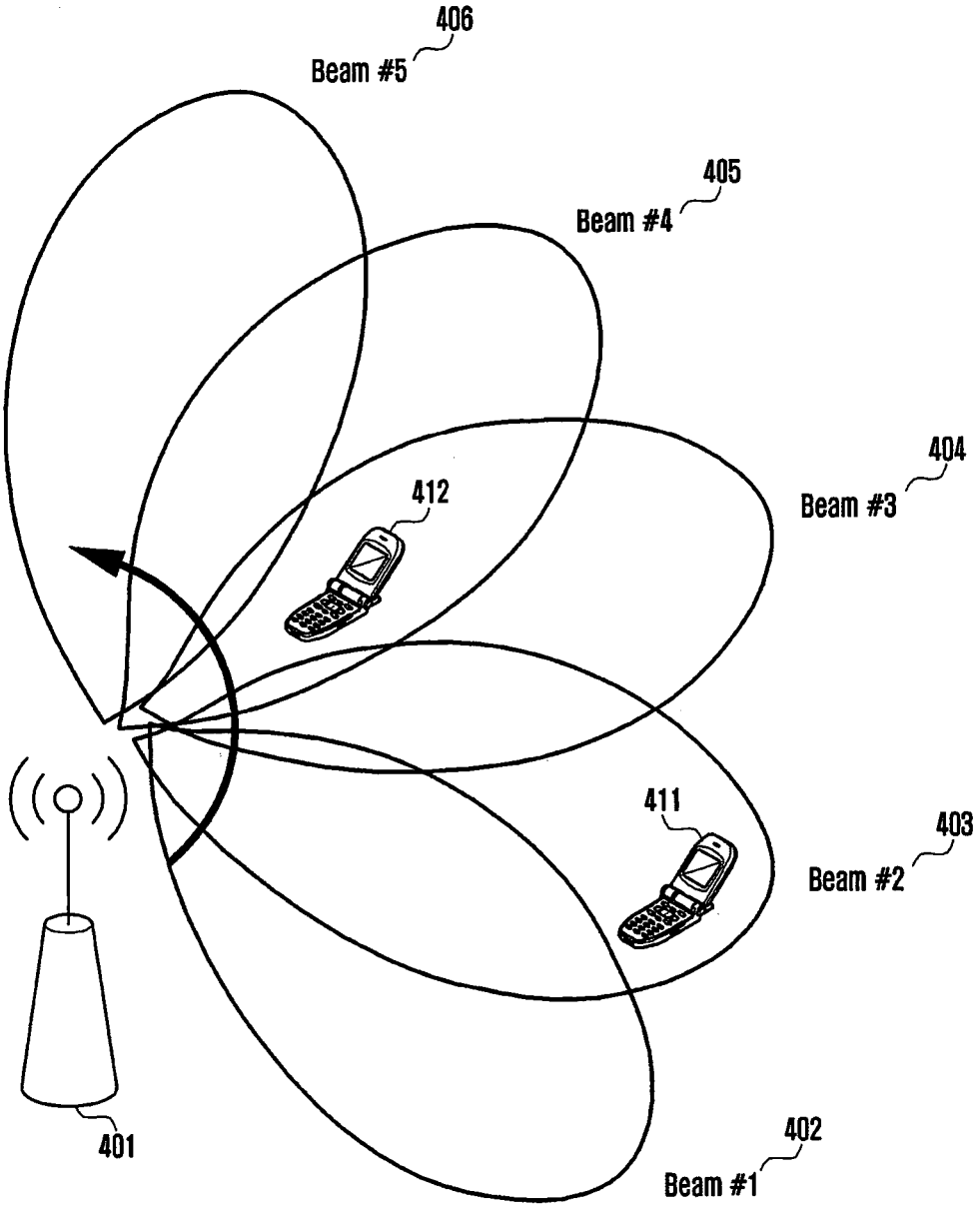
FIG. 4 is a diagram illustrating a multi-beam-based common channel transmission method, according to an embodiment of the present invention.

FIG. 4 is a diagram illustrating a multi-beam-based common channel transmission method, according to an embodiment of the present invention.

As shown in FIG. 4, the cell under control of an eNB 401 is covered by [four] *five* beams 402 to 406. Since one beam, e.g. beam 402, which is formed with the transmit power available at the eNB 401, cannot cover the entire cell, it is difficult to allow all the UEs within the cell to receive the common channel broadcast by the eNB 401. As shown in the embodiment of FIG. 4, it is impossible for UEs 411 and 412 to receive the same information carried by one beam.

Embodiments of the present invention propose a beam sweeping technique which forms several distinct beams at different times. Specifically, the first beam 402 is formed at the first time, the second beam 403 at the second time, the third beam 404 at the third time, the fourth beam 405 at the fourth time, and the fifth beam 405 at the fifth time.

Although FIG. 4 is directed to the case of using 5 beams for covering the entire cell, the number of beams may be determined or variable depending on the real system environment. The UE 411 may receive the common channel through the second beam 403, and the UE 412 located at the intersection of the third and fourth beams 404 and 405 may receive the common channel through both the fourth and fifth beams 404 and 405. The five beams 402 to 406 may carry the same information or distinct information. Descriptions are made of the definitions on the SCH and BCH for use in initial access, the method for the eNB to transmit the common channel, and UE operation of receiving the common channel in the case of using the beam sweeping technique. In embodiments of the present invention, the term 'beam' may denote a signal transmitted through a beam formed with a plurality of antenna and a beam coverage in which the signal is receivable. Accordingly, the term 'beam' may be substituted by a term incorporating the above meaning.

A description is made of the FD-MIMO technique as a basis of embodiments of the present invention.

In an embodiment of the present invention, SCH transmission is provided using beam sweeping. As described above, the UE performs an initial access procedure to connect to the eNB and, in the case of using the FD-MIMO, the UE needs to use beam sweeping for transmitting downlink common channel necessary for the initial access. Although this embodiment of the present invention is directed to an LTE system frame structure and initial access procedure, the frame structure, number of beams, and other details may be changed without departing from the scope of the subject matter described in embodiments of the present invention.

When using the beam sweeping technique, the common channel, such as SCH, is transmitted over all of the beams. In order to transmit the SCH arranged at two subframes of one radio frame, as shown in FIG. 3, over several beams at different timings, it is necessary to use the resources at several different timings for SCH transmission.

Figure 5:
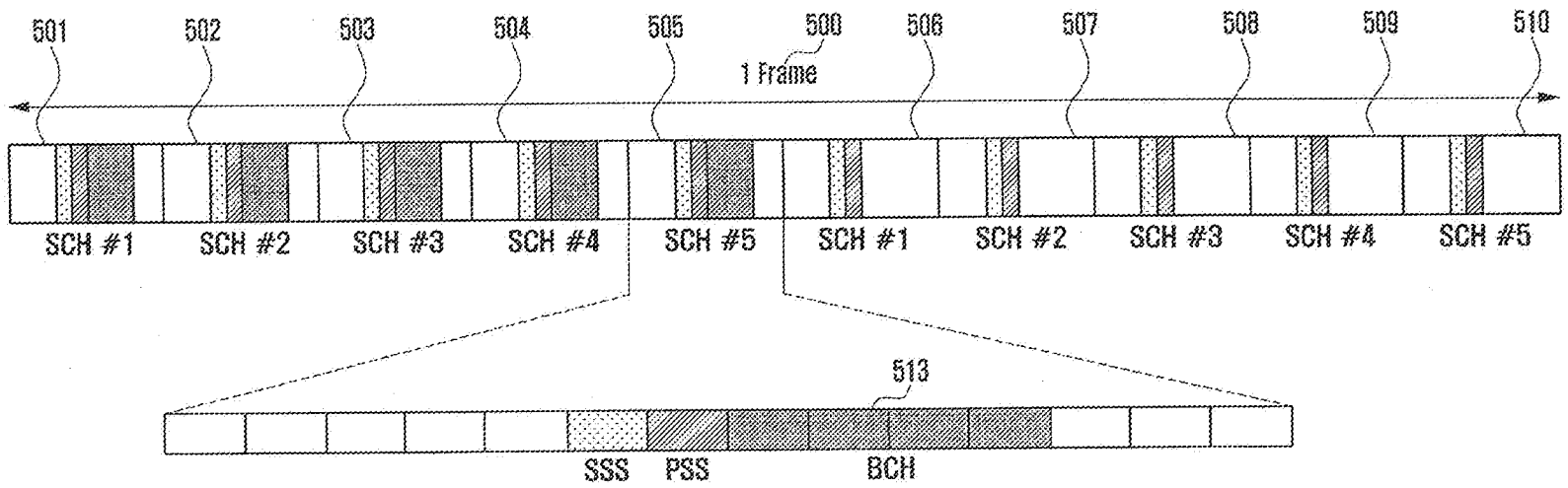
FIG. 5 is a diagram illustrating a frame structure for SCH transmission in the LTE system using the beam sweeping technique, according to an embodiment of the present invention.

FIG. 5 is a diagram illustrating a frame structure for SCH transmission in the LTE system using the beam sweeping technique, according to an embodiment of the present invention. The SCH appearing at subframes 501 and 506 are arranged as in the legacy LTE system. In the case of using the beam sweeping, the SCHs at the subframes 501 and 506 are transmitted over one of the beams 402 to 406 of FIG. 4, such that it is difficult for all the UEs within the cell to receive the SCH carried at the subframes 501 and 506.

In an embodiment of the present invention, extra SCH is generated per beam as shown in FIG. 5. When using 5 beams as shown in FIG. 4, 5 beam-specific SCHs (i.e. SCH1 501 and 506, SCH2 502 and 507, SCH3 503 and 508, SCH4 504 and 509, and SCH5 505 and 510) have to be generated and transmitted on the respective beam at different timings. The SCH number and beam number may be mapped randomly, and the orders of SCHs and beams may match each other or mapped to each other randomly.

Although this embodiment of the present invention is directed to the case of using the 5 beams and 5 SCHs, if the number of beams is less than 5, it is possible to select SCHs matching the beams in number and determine the SCH positions randomly or according to a predetermined rule. As the rule of determining the SCH positions, a method of selecting the subframes as many as the required number of SCHs from the first subframe may be used.

The PSS is transmitted as SCH-specific code, i.e. the code determined differently depending on the beam. This means that the PSS is restricted depending on the subframe, such that the UE is capable of checking the position of the subframe carrying the current SCH only by receiving one SCH. In this case, if the UE receives PSS and SSS codes of the SCH determined based on the received beam, it is possible to determine the subframe carrying the current SCH in the radio frame regardless of the location of the UE within the cell. The different PSS codes may be generated in such a way of generating a reference PSS code and shifting the reference PSS code cyclically. Also, the different PSS codes may be generated in such a way of performing scrambling on the reference PSS code.

Figure 6A:
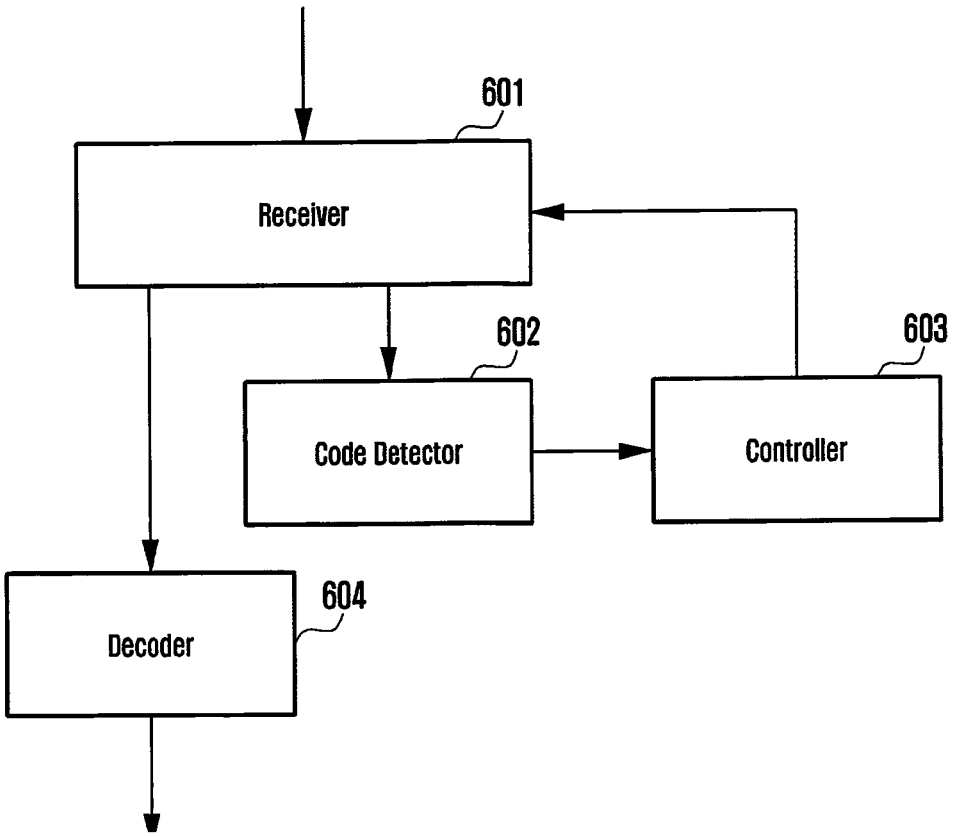
FIG. 6A is a block diagram illustrating a configuration of the UE, according to an embodiment of the present disclosure.
Figure 6B:
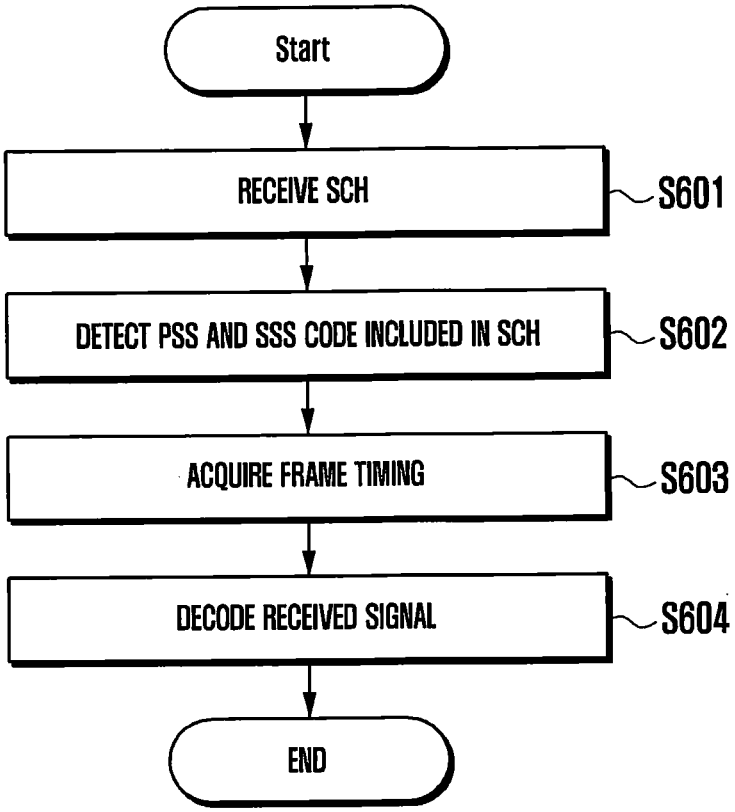
FIG. 6B is a flowchart illustrating the operation procedure of the UE, according to an embodiment of the present invention.

FIGS. 6A and 6B show the operations of the UE receiving SCH in the case of applying the beam sweeping, according to an embodiment of the present invention. FIG. 6A is a block diagram illustrating a configuration of the UE according to an embodiment of the present invention, and FIG. 6B is a flowchart illustrating the operation procedure of the UE according to an embodiment of the present invention.

The UE receives SCH by means of a receiver 601, in step S601. The UE detects the codes of the PSS and SSS included in the SCH by means of a code detector 602, in step S602. The UE acquires the frame timing with the received code by means of a controller 603, in step S603. The UE decodes the signal received by the receiver 601 according to the frame timing under the control of the controller 603 by means of the decoder 604, in step S604.

The decoder 604 may be used for decoding the signal such as BCH and PDSCH.

Figure 7A:
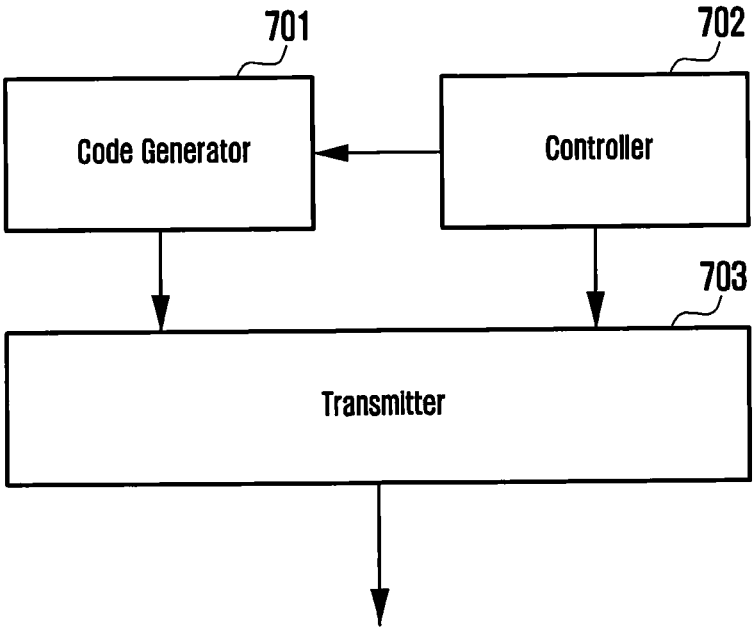
FIG. 7A is a block diagram illustrating a configuration of the eNB, according to an embodiment of the present invention.
Figure 7B:
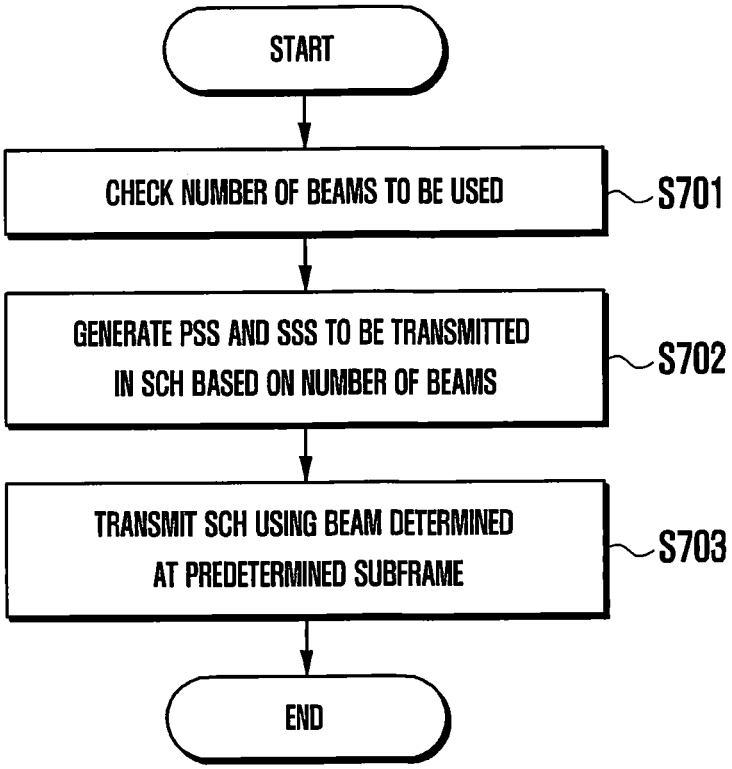
FIG. 7B is a flowchart illustrating the operation procedure of the eNB, according to an embodiment of the present invention.

FIGS. 7A and 7B show the operations of the eNB transmitting SCH in the case of applying the beam sweeping, according to an embodiment of the present invention. FIG. 7A is a block diagram illustrating a configuration of the eNB according to an embodiment of the present invention, and FIG. 7B is a flowchart illustrating the operation procedure of the eNB according to an embodiment of the present invention.

A SCH code generator 701 checks the number of beams to be used, in step S701. The SCH code generator 701 generates the codes to be included in the SCH, i.e. PSS and SSS corresponding to the number of beams, to a transmitter 703.

The transmitter 703 transmits SCH, including the code determined by a controller 702, using the beam determined by the controller 702, at the subframe determined by the controller 702, under control of the controller 702, in step S703.

In another embodiment of the present invention BCH transmission is performed using beam sweeping. This embodiment is directed to the BCH reception according to the UE location.

In the case of using the beam [steeping] *sweeping* technique proposed in embodiments of the present invention, the SCH is transmitted at every subframe in the LTE system as shown in FIG. 5. BCH is mapped to the four OFDM symbols right after the SCH in the subframe carrying the first one of the two paired SCHs as denoted by reference number 513 of FIG. 5. Similar to SCH, if the beam sweeping is applied to BCH, the BCH is transmitted over the subframes 501 to 505.

The BCH is received at the BCH positions determined based on the frame timing acquired through SCH. The BCH carries the MIB as the cell-specific information and includes SIB scheduling information for use in SIB as more detailed system information. For the beam sweeping with the FD-MIMO, an embodiment of the present invention introduces beam-specific information (hereinafter, referred to as BIB). The UE receives the MIB through BCH transmitted by the eNB, and the MIB includes the scheduling information on BIB. The UE receives a different MIB depending on the beam transmitted by the eNB, so as to receive the distinct BIB according to the received beam. If the UE receives the BCH through a certain beam, it acquires the system information corresponding to the received beam. Specifically, since the different information is received depending on the beam, the BCH is configured in the way of receiving different BIBs through different beams. The cell-specific information is transmitted in the same MIB through all the beams carrying BCHs.

Referring to FIG. 5, the BCH transmitted at the subframe 501 includes the MIB corresponding to beam 1, and the MIB includes the SIB as the cell-specific information and the scheduling information for use in the BIB corresponding to beam 1 among the five beams. The BCH transmitted at the subframe 502 includes the MIB corresponding to beam 2 and, the MB includes the SIB as the cell-specific information and scheduling information for use in receiving BIB corresponding to beam 2 among the five beams. The BCH transmitted at the subframe 503 includes the MIB corresponding to beam 3 and, the MIB includes the SIB as the cell-specific information and scheduling information for use in receiving BIB corresponding to beam 3 among the five beams. The BCH transmitted at the subframe 504 includes the MIB corresponding to beam 4 and, the MIB includes the SIB as the cell-specific information and scheduling information for use in receiving BIB corresponding to beam 4 among the five beams. The BCH transmitted at the subframe 505 includes the MIB corresponding to beam 5 and, the MIB includes the SIB as the cell-specific information and scheduling information for use in receiving BIB corresponding to beam 5 among the five beams. The BIB may include other information necessary for transmitting and receiving the signals using the beam pattern, for example, uplink random access parameter information, power control information, and TDD downlink/uplink configuration information. Particularly, the uplink random access information includes the information on the resource for transmitting Uplink Random Access Channel (UL RACH) and, if different UL RACH resources are used for respective beams, the eNB is capable of checking when the UE transmits the UL RACH so as to improve the reception beamforming gain and, if the same beam is used in transmitting the response in replay to the UL-RACH, transmission beamforming gain. If the type of the beam to receive changes due to the change of the UE location within the cell, the BIB also has to change in corresponding to the new beam. At this time, the BIB may be transmitted to the UE through the BCH corresponding to the new beam or DL-SCH.

In another embodiment of the present invention, BCH is interpreted according to beam sweeping. This embodiment is directed to an uplink random access method according to the UE location. In the first described embodiment using the beam sweeping, the beam-specific SCH is transmitted in the way of transmitting SCH per subframe, such that the UE acquires the frame timing. In the case of an LTE system, SCH is transmitted at every subframe, and the BCH is mapped to four OFDM symbols following the SCH at the subframes carrying the first of the two paired SCHs as denoted by reference number 513 of FIG. 5. Like SCH, if the beam sweeping is used, the BCH is transmitted at the subframes 501 to 505. In an embodiment of the present invention, BCH includes the information on a relationship between SCH and beam and UE operation dependent on the beam. Specifically, the UE that has received SCH is capable of acquiring the information on the currently received beam through BCH. The UEs that receive SCH at different subframes receive different beams, resulting in acquisition of different information. The UE receives different BCH information, i.e., different MIB information indicating the location of the BIB, interpreted according to the received beam as well as the beam information. The information-beam specific information may include the other information necessary for transmitting and receiving signal using the beam pattern such as UL random access parameter information, power control information, and TDD DL/UL configuration information.

Figure 8A:
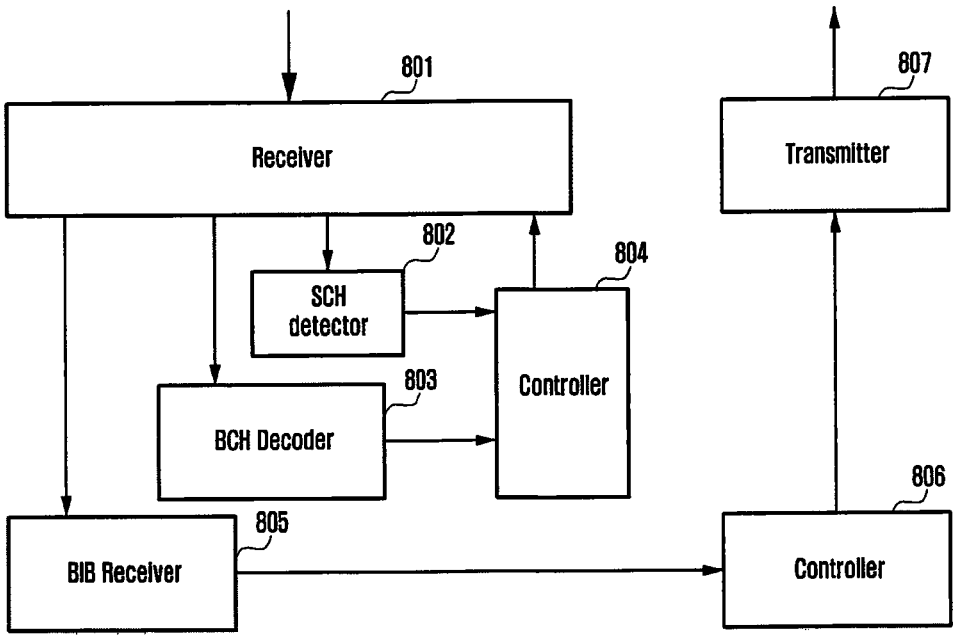
FIG. 8A is a block diagram illustrating the configuration of the UE, according to an embodiment of the present invention.
Figure 8B:
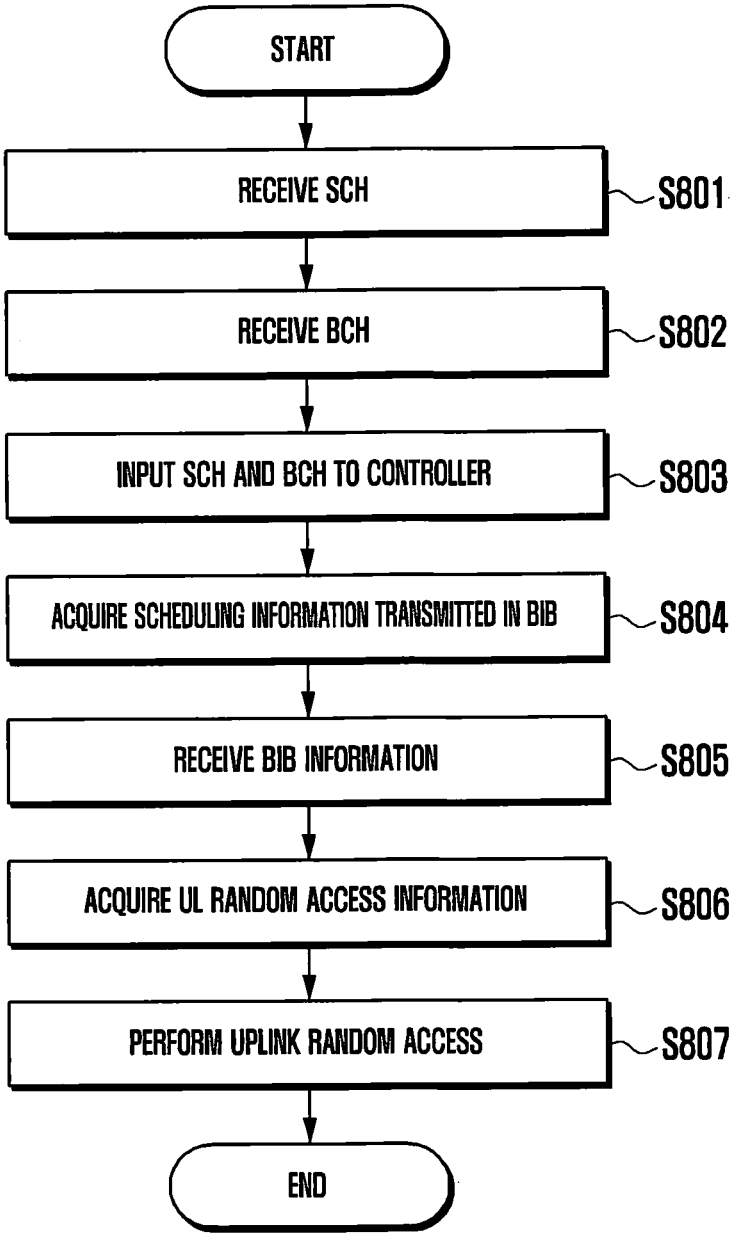
FIG. 8B is a flowchart illustrating the operation procedure of the UE, according to an embodiment of the present invention.

FIGS. 8A and 8B illustrate operations of the UE when the BCH interpretation method changes according to the beam in the beam sweeping-based method, according to an embodiment of the present disclosure. FIG. 8A is a block diagram illustrating the configuration of the UE, according to an embodiment of the present invention. FIG. 8B is a flowchart illustrating the operation procedure of the UE, according to an embodiment of the present invention.

The UE receives SCH by means of a receiver 801 and an SCH detector 802, in step S801. The UE reads BCH by means of a BCH decoder 803, in step S802.

The receiver inputs the SCH information and BCH information, i.e., MIB information, to a controller 804, in step S803. The controller 804 acquires scheduling information from BIB transmitted in the two pieces of information, in step S804, and controls the receiver 801 based on the scheduling information to receive DL-SCH at the BIB transmission position and acquire the BIB information at a BIB receiver 805, in step S805.

The BIB information is input to a transmission controller 806, and the transmission controller 806 acquires the UL random access information, particularly UL-RACH resource information, included in the BIB, in step S806. Then the transmission controller controls a transmitter 807 based on the UL random access information, such that the UE performs UL random access on the resource indicated by UL-RACH resource information included in the BIB, in step S807.

Figure 9A:
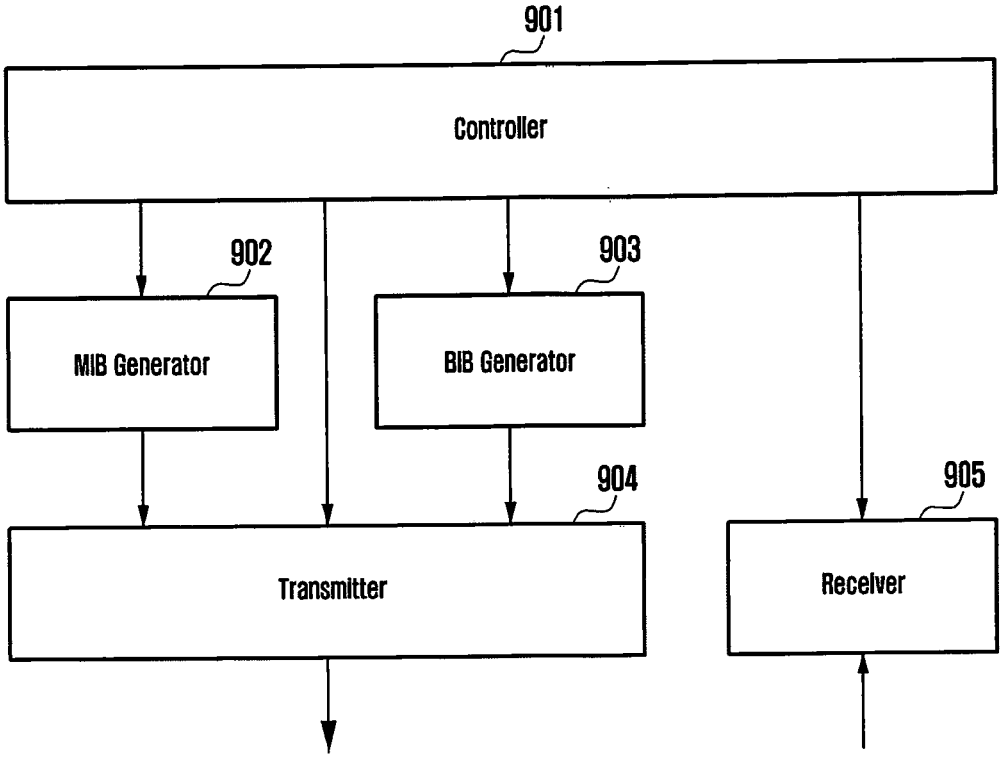
FIG. 9A is a block diagram illustrating a configuration of the eNB according to an embodiment of the present disclosure.
Figure 9B:
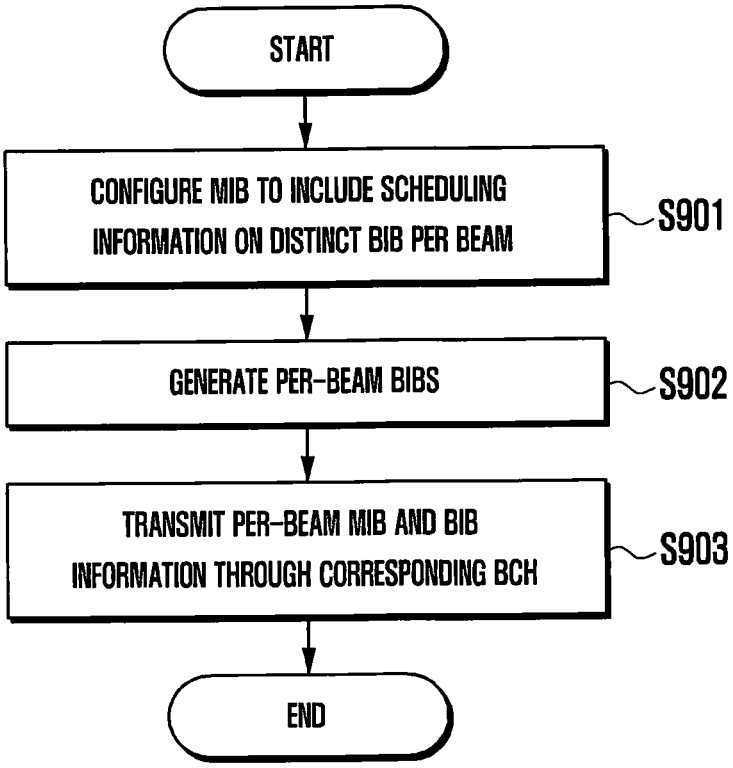
FIG. 9B is a flowchart illustrating the operation procedure of the eNB according to an embodiment of the present disclosure.

FIGS. 9A and 9B are diagrams illustrating operations of the eNB for transmitting per-beam BCH and BIB in the case of applying the beam sweeping, according to an embodiment of the present invention. FIG. 9A is a block diagram illustrating a configuration of the eNB according to an embodiment of the present invention, and FIG. 9B is a flowchart illustrating the operation procedure of the eNB according to an embodiment of the present invention.

A controller 901 controls an MIB generator 902 to include the scheduling information on the beam-specific BIB in the MIB, in step S901.

The controller 901 controls a BIB generator 903 to generate the beam-specific BIB, in step S902, and controls a transmitter 904 to transmit the beam-specific MIB and BIB information using the corresponding BCH and DL-SCH, in step S903. The controller 901 controls a receiver 905 to receive UL-RACH transmitted by the UE receiving a predetermined beam.

The signal transmission/reception method of embodiments of the present invention is capable of efficiently performing the initial access at a low transmit power level in the FD-MIMO system having a few dozen or more transmit antennas.

Although the internal structures of the UE and the eNB of embodiments of the present invention have been described with reference to the accompanying drawings, each of the UE and the eNB may be configured with a transceiver for transmitting/receiving signal to/from the peer node and a controller for controlling its functions. The controller's functions of each node have been described in detailed at the respective parts.

While the invention has been shown and described with reference to certain embodiments thereof, it will be understood by those skilled in the art that various changes in form and detail may be made therein without departing from the spirit and scope of the invention as defined by the appended claims.

What is claimed is:

[1. A method by a base station of a mobile communication system using multi-antenna-based, beamforming, the method comprising:

identifying a plurality of beams to be used for transmission; and transmitting, to each terminal in a cell of the base station, common channel information through each of the plurality of the beams, wherein the common channel information is information to be commonly applied to terminals which belong to the cell of the base station, wherein the common channel information comprises a synchronization channel including a first synchronization signal and a second synchronization signal, and wherein the common channel information transmitted through each of the plurality of beams to each terminal is included in different subframes in a frame and the first synchronization signal includes a beam-specific code, which is a synchronization channel-specific code determined differently depending on the beam, such that each terminal identifies a sublime carrying the first synchronization signal based on the beam-specific code for acquiring frame timing.]

[2. The method of claim 1, wherein the common channel information further comprises a broadcast channel.]

[3. The method of claim 2, wherein the broadcast channel comprises a master information block as cell-specific information, the master information block comprising scheduling information on beam-specific information including system information on a certain beam, the beam-specific information comprising at least one of uplink random access information, power control information, Time Division Duplex (TDD) downlink/uplink configuration information.]

[4. A method by a terminal in a mobile communication system using multi-antenna-based beamforming, the method comprising:

receiving common channel information transmitted through a beam by a base station, wherein the common channel information is included in a certain subframe in a frame and comprises a synchronization channel including a first synchronization signal and a second synchronization signal, the first synchronization signal including a beam-specific code, which is a synchronization channel-specific code determined differently depending on the beam, identifying the subframe carrying the first synchronization signal based on the beam-specific code;

acquiring frame timing based on a result of the identification of the subframe; and receiving a signal transmitted by the base station based on the frame timing, wherein the common channel information is transmitted through each of a plurality of beams, and the common channel information transmitted through each of the plurality of beams is included in different subframes in a frame, wherein the common channel information is information to be commonly applied to terminals which belong to a cell of the base station.]

[5. The method of claim 4, wherein the common channel information further comprises a broadcast channel.]

[6. The method of claim 5, wherein the broadcast channel comprises a master information block as cell-specific information, the master information block comprising scheduling information on beam-specific information including system information on a certain beam, the beam-specific information comprising at least one of uplink random access information, power control information, Time Division Duplex (TDD) downlink/uplink configuration information.]

[7. A base station in a mobile communication system using multi-antenna-based beamforming, the base station comprising:

a transceiver configured to transmit and receive signals; and a controller configured to identify a plurality of beams to be used for transmission, and control the transceiver to transmit, to each terminal in a cell of the base station, common channel information through each of the plurality of the beams, wherein the common channel information is information to be commonly applied to terminals which belong to the cell of the base station, wherein the common channel information comprises a synchronization channel including a first synchronization signal and a second synchronization signal, and wherein the common channel information transmitted through each of the plurality of beams to each terminal is included in different subframes in a frame and the first synchronization signal includes a beam-specific code, which is a synchronization channel-specific code determined differently depending on the beam, such that each terminal identifies a subframe carrying the first synchronization signal based on the beam-specific code for acquiring frame timing.]

[8. The base station of claim 7, wherein the common channel information further comprises a broadcast channel.]

[9. The base station of claim 8, wherein the broadcast channel comprises a master information block as cell-specific information, the master information block comprising scheduling information on beam-specific information including system information on a certain beam, the beam-specific information comprising at least one of uplink random access information, power control information, Time Division Duplex (TDD) downlink/uplink configuration information.]

[10. A terminal in a mobile communication system using multi-antenna-based beamforming, the terminal comprising:

a transceiver configured to transmit and receive signals to and from a base station; and a controller configured to control the transceiver to:

receive common channel information transmitted through a beam by a base station, wherein the common channel information is included in a certain subframe in a frame and comprises a synchronization channel including a first synchronization signal and a second synchronization signal, the first synchronization signal including a beam-specific code, which is a synchronization channel-specific code determined differently depending on the beam, identify the subframe carrying the first synchronization signal based on the beam-specific code, acquire frame timing based on a result of the identification of the subframe, and receive a signal transmitted by the base station based on the frame timing, wherein the common channel information is transmitted through each of a plurality of beams and the common channel information transmitted through each of the plurality of beams is included in different subframes in a frame, wherein the common channel information is information to be commonly applied to terminals which belong to a cell of the base station.]

[11. The terminal of claim 10, wherein the common channel information further comprises a broadcast channel.]

[12. The terminal of claim 11, wherein the broadcast channel comprises a master information block as cell-specific information, the master information block comprising scheduling information on beam-specific information including system information on a certain beam, the beam-specific information comprising at least one of uplink random access information, power control information, Time Division Duplex (TDD) downlink/uplink configuration information.]

*13. A terminal for processing synchronization signals and system information in a mobile communication system, the terminal comprising:*

*a transceiver; and*

*a processor configured to:*

*receive, from a base station via the transceiver, a block including a primary synchronization signal (PSS), a secondary synchronization signal (SSS), and a broadcast channel (BCH), wherein the block is one among a set of blocks and each block in the set of blocks is a candidate for receiving the PSS, SSS and the BCH,*

*obtain master information in the BCH of the block, and*

*receive, from the base station via the transceiver, system information in a downlink shared channel based on the master information in the BCH of the block,*

*wherein the set of blocks are defined based on a time duration corresponding to 5 sub-frames of 10 sub-frames within one frame,*

*wherein the PSS of the block is separated from the SSS and the BCH in a time domain,*

*wherein random access information associated with the block is included in the system information,*

*wherein the block is associated with a beam-specific code and a beam of at least one beam for the set of blocks,*

*wherein the set of blocks are indexed in an ascending order in the time domain,*

*wherein a time synchronization is identified based on the block associated with the beam-specific code, and*

*wherein the system information includes cell-specific information.*

*14. The terminal of claim 13, wherein each block among the set of blocks is numbered and a position of the block is predetermined.*

*15. The terminal of claim 13, wherein the processor is further configured to identify a cell identifier (ID) based on the block.*

*16. The terminal of claim 13, wherein a subset of blocks transmitted from the base station is determined.*

*17. The terminal of claim 13, wherein the random access information associated with the block includes information on resources for transmitting a physical random access channel.*

*18. A base station for processing synchronization signals and system information in a mobile communication system, the base station comprising:*

*a transceiver; and*

*a processor configured to:*

*transmit, to a terminal via the transceiver, a block including a primary synchronization signal (PSS), a secondary synchronization signal (SSS), and a broadcast channel (BCH), wherein the block is one among a set of blocks and each block in the set of blocks is a candidate for receiving the PSS, SSS and the BCH, and*

*transmit, to the terminal via the transceiver, system information in a downlink shared channel based on master information in the BCH,*

*wherein the set of blocks are defined based on a time duration corresponding to 5 sub-frames of 10 sub-frames within one frame,*

*wherein the PSS of the block is separated from the SSS and the BCH in a time domain,*

*wherein the master information is transmitted in the BCH,*

*wherein random access information associated with the block is included in the system information,*

*wherein the block is associated with a beam-specific code and a beam of at least one beam for the set of blocks,*

*wherein the set of blocks are indexed in an ascending order in the time domain,*

*wherein a time synchronization is identified based on the block associated with the beam-specific code, and*

*wherein the system information includes cell-specific information.*

*19. The base station of claim 18, wherein each block among the set of blocks is numbered and a position of the block is predetermined.*

*20. The base station of claim 18, wherein a cell identifier (ID) is identified based on the block.*

*21. The base station of claim 18, wherein the processor is further configured to determine a subset of blocks to be transmitted.*

*22. The base station of claim 18, wherein the random access information associated with the block includes information on resources for transmitting a physical random access channel.*

*23. A method for processing synchronization signals and system information in a mobile communication system, the method comprising:*

*receiving, from a base station, a block including a primary synchronization signal (PSS), a secondary synchronization signal (SSS), and a broadcast channel (BCH), wherein the block is one among a set of blocks and each block in the set of blocks is a candidate for transmitting the PSS, SSS and the BCH;*

*obtaining master information in the BCH of the block; and*

*receiving, from the base station, system information in a downlink shared channel based on the master information in the BCH of the block,*

*wherein the set of blocks are defined based on a time duration corresponding to 5 sub-frames of 10 sub-frames within one frame,*

*wherein the PSS of the block is separated from the SSS and the BCH in a time domain,*

*wherein random access information associated with the block is included in the system information,*

*wherein the block is associated with a beam-specific code and a beam of at least one beam for the set of blocks,*

*wherein the set of blocks are indexed in an ascending order in the time domain,*

*wherein a time synchronization is identified based on the block associated with the beam-specific code, and*

*wherein the system information includes cell-specific information.*

*24. The method of claim 23, wherein each block among the set of blocks is numbered and a position of the block is predetermined.*

*25. The method of claim 23, further comprising identifying a cell identifier (ID) based on the block.*

*26. The method of claim 23, wherein a subset of blocks transmitted from the base station is determined.*

*27. The method of claim 23, wherein the random access information associated with the block includes information on resources for transmitting a physical random access channel.*

*28. A method for processing synchronization signals and system information in a mobile communication system, the method comprising:*

*transmitting, to a terminal, a block including a primary synchronization signal (PSS), a secondary synchronization signal (SSS), and a broadcast channel (BCH), wherein the block is one among a set of blocks and each block in the set of blocks is a candidate for transmitting the PSS, SSS and the BCH; and*

*transmitting, to the terminal, system information in a downlink shared channel based on master information in the BCH,*

*wherein the set of blocks are defined based on a time duration corresponding to 5 sub-frames of 10 sub-frames within one frame,*

*wherein the PSS of the block is separated from the SSS and the BCH in a time domain,*

*wherein the master information is transmitted in the BCH,*

*wherein random access information associated with the block is included in the system information,*

*wherein the block is associated with a beam-specific code and a beam of at least one beam for the set of blocks,*

*wherein the set of blocks are indexed in an ascending order in the time domain,*

*wherein a time synchronization is identified based on the block associated with the beam-specific code, and*

*wherein the system information includes cell-specific information.*

*29. The method of claim 28, wherein each block among the set of blocks is numbered and a position of the block is predetermined.*

*30. The method of claim 28, wherein a cell identifier (ID) is identified based on the block.*

*31. The method of claim 28, further comprising determining a subset of blocks to be transmitted.*

*32. The method of claim 28, wherein the random access information associated with the block includes information on resources for transmitting a physical random access channel.*

* * * * *